E. CLARK.

Improvement in Registering Steam Gauges.

No. 4,775. Reissued March 5, 1372.

Witnesses.
C. H. Poole.
John R. Young.

Inventor.
Elijah Clark,
United States Steam Gauge Co.
assignees,
by Prin. Stedadger.
their Attys

UNITED STATES PATENT OFFICE.

ELIJAH CLARK, OF LOUISVILLE, KENTUCKY, ASSIGNOR TO THE UNITED STATES STEAM-GAUGE COMPANY.

IMPROVEMENT IN REGISTERING STEAM-GAUGES.

Specification forming part of Letters Patent No. 101,583, dated April 5, 1870; reissue No. 4,775, dated March 5, 1872.

*To all whom it may concern:*

Be it known that ELIJAH CLARK, of Louisville, county of Jefferson, State of Kentucky, assignor to "The United States Steam-Gauge Company," of Louisville, has invented a new and Improved Registering Steam-Gauge, of which the following is an accurate description, reference being had to the accompanying drawing making a part of this specification, in which—

Figure 1:
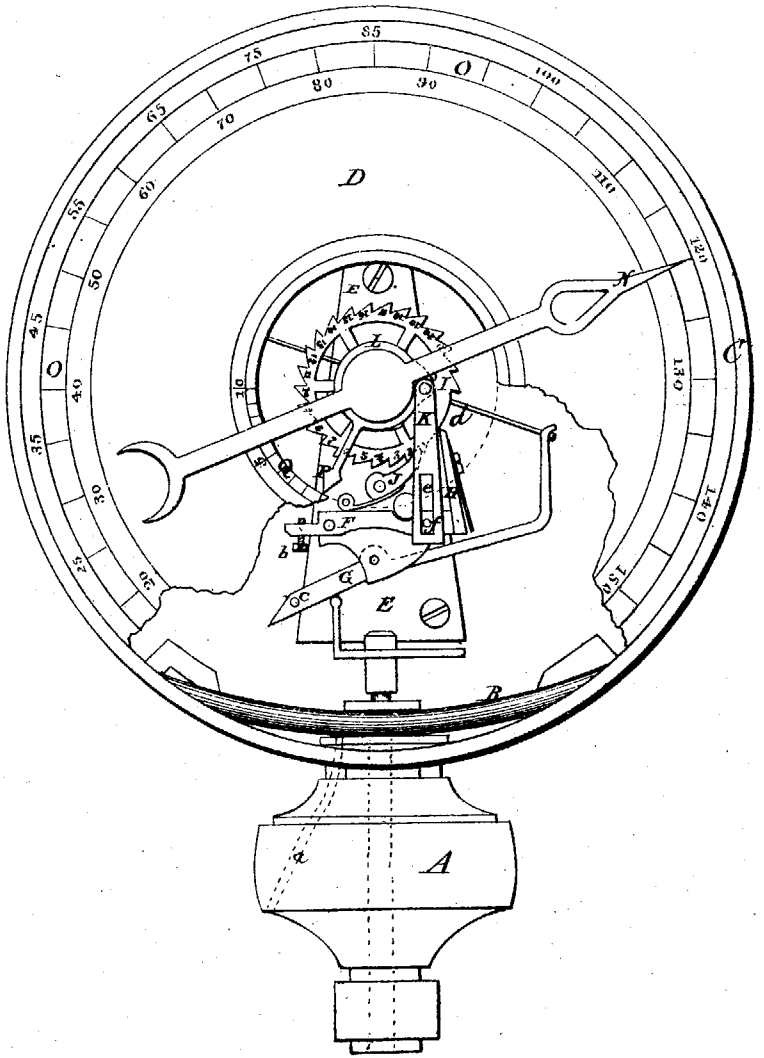
Figure 2:
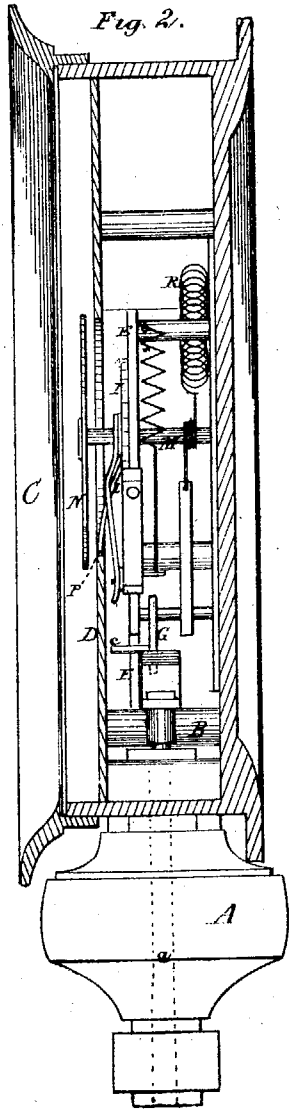

Figure 1 is a plan view of my device; Fig. 2, a vertical central section of the same.

Letters of like name and kind refer to like parts in each of the figures.

The object of the invention of said CLARK is the construction of a gauge which shall register automatically every excess of the prescribed pressure of steam in boilers and also the maximum pressure: and it consists in certain combinations of its operative parts for the purpose of effecting the above object, all as more fully hereinafter described and set forth.

In the drawing, A represents a hollow knob, into the diaphragm of which steam passes from the boiler and operates a pressure-rod, which communicates movement to a suitable spring, B, placed conveniently within the case C, which is covered by the dial-plate D. This knob has also a drip or passages, *a*, to conduct away any moisture which may collect in the operation of the device. A plate, E, has pivoted upon it a lever, F, which has a set-screw, *b*, projecting from a point near one end, which set-screw is in the path of the pin *c*, which extends from the arm G, also suitably pivoted. At the other end of the lever F is pivoted a pawl, H, having a pointed end, which is kept by a proper spring in contact with the registering ratchet-wheel I, the teeth of which are numbered consecutively from 1 upward, a space, *d*, however, being left between the first and last teeth. A detent, J, is connected with the lever F, and engages as a pawl with the teeth of the registering-wheel. A link, K, having near one end a slot, *e*, through which passes a pin, *f*, which projects from the lever F, is jointed at its other end to one side of a disk, L, which disk has for its axis the shaft M, which shaft M carries the index-finger P, extending over a scale, O, upon the face of the dial-plate. From another side of the disk L projects the index-finger P, extending over a scale, Q, also upon the face of the dial-plate. A suitable spring, R, which is connected with the shaft M, completes the enumeration of the separate parts of the device.

In operation, the set-screw *b* is so adjusted that it will not be operated upon by the pin *c*, except by an excess of the prescribed pressure of steam, and the registering-wheel is revolved, so that the end of the pawl H shall rest against the side of its first tooth. The index-finger P is then placed in proper adjustment at the zero pressure, and the case is locked up and sealed by the proper official. When the steam exceeds the prescribed limit of pressure the spring B will move the arm G and carry the pin *c* against the set-screw *b* in the lever F, which, in turn, being moved, will carry the pawl H, the pressure of the end of which against a tooth of the registering-wheel I will cause it to revolve the distance of one tooth and no more, while the pressure of the detent J will prevent said wheel from moving back. Thus, in every instance of excess of the prescribed pressure, the registering-wheel is revolved the distance of one tooth, and the number of teeth above the end of the pawl H will always exhibit the number of such excesses during a trip or voyage or specified time. That it may be out of the power of the engineer, by keeping up a great pressure, to turn the wheel an entire revolution so as to bring it back to the point where it was adjusted by the proper official, the space *d* is provided, so that when said space meets the end of the pawl H it will have nothing to strike against, and the registering-wheel will be revolved no more by any pressure of steam. As the registering-wheel thus records the number of excesses of pressure the index-finger P records the maximum pressure at any time, the pin *f* in any movement of the lever F, caused by excess of pressure, moving the link K, which in turn revolves the disk L, which carries the index-finger P around its scale. As the pin *f* moves freely in the slot above mentioned, the index-finger cannot return, and can only be moved forward by a still greater excess of pressure.

Having thus described this gauge, what we claim as new therein, and the invention of ELIJAH CLARK, is—

1. In a registering steam-gauge, the combination of the following instrumentalities, viz: First, a registering-wheel; second, suitable mechanism for revolving the same in one direction and for preventing its return; and, third, suitable means for adjustment, so that the gauge will be operative as a register only at a prescribed limit of steam pressure, all constructed and operating substantially as set forth.

2. In a registering steam-gauge, the combination of the lever F, slotted link K, and the index-finger P upon the shaft M, operated by the excess of the prescribed pressure of steam for the purpose of recording the maximum pressure, substantially as set forth.

3. In a registering steam-gauge, the combination of the registering-wheel I, the index-finger P, the lever F, the link K, the pawl H, and detent J, for the purpose of denoting, by the same impulse, at the same time, the number of excesses and the maximum excess of steam pressure, all constructed and operating substantially as set forth.

4. In a registering steam-gauge, the combination of the registering-wheel I provided with the recess *d*, and the levers F and H, constructed and arranged substantially as described and shown, for the purpose of preventing continuous revolution of said wheel, as set forth.

5. In a registering steam-gauge, the combination of the set-screw *b* with the lever F, for the purpose of adjustment of the gauge to the zero of the prescribed limit of steam pressure, substantially as set forth.

UNITED STATES STEAM-GAUGE CO.
By S. W. CLOYD,
*President and Executive Officer.*

Witnesses:
WILLIAM CROMEY,
C. P. BARNES.